(12) United States Patent
Kumar et al.

(10) Patent No.: US 7,256,513 B2
(45) Date of Patent: Aug. 14, 2007

(54) LOCOMOTIVE AUXILIARY POWER SYSTEM

(75) Inventors: Ajith Kuttannair Kumar, Erie, PA (US); Dimitrios Ioannidis, Erie, PA (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 11/002,765

(22) Filed: Dec. 2, 2004

(65) Prior Publication Data

US 2006/0119177 A1   Jun. 8, 2006

(51) Int. Cl.
*H02J 7/30* (2006.01)
*H02J 15/00* (2006.01)

(52) U.S. Cl. ...................................... 307/9.1
(58) Field of Classification Search ................ 307/9.2
See application file for complete search history.

(56) References Cited

U.S. PATENT DOCUMENTS

| | | | |
|---|---|---|---|
| RE29,579 E | 3/1978 | Simon | |
| 4,461,985 A | 7/1984 | Stitt | |
| 4,524,316 A | 6/1985 | Brown et al. | |
| 4,645,940 A | 2/1987 | Wertheim | |
| 4,791,341 A | 12/1988 | Brown et al. | |
| 5,334,878 A | 8/1994 | Vanek et al. | |
| 5,517,093 A * | 5/1996 | Augustyniak et al. | 318/63 |
| 5,528,445 A | 6/1996 | Cooke et al. | |
| 5,552,681 A | 9/1996 | Suzuki et al. | |
| 5,903,449 A | 5/1999 | Garrigan et al. | |
| 5,929,537 A | 7/1999 | Glennon | |
| 5,998,885 A | 12/1999 | Tamor et al. | |
| 6,441,581 B1 * | 8/2002 | King et al. | 320/101 |
| 6,486,568 B1 | 11/2002 | King et al. | |
| 6,486,627 B1 * | 11/2002 | Gabrys | 318/161 |
| 6,591,758 B2 * | 7/2003 | Kumar | 105/35 |
| 6,612,245 B2 * | 9/2003 | Kumar et al. | 105/26.05 |
| 6,612,246 B2 * | 9/2003 | Kumar | 105/34.2 |

* cited by examiner

*Primary Examiner*—Brian Sircus
*Assistant Examiner*—Adi Amrany
(74) *Attorney, Agent, or Firm*—Carlos Hanze, Esq.; Enrique J. Mora, Esq.; Beusse Wolter Sanks Mora & Maire, P.A.

(57) ABSTRACT

A locomotive auxiliary power system and control techniques for such a system are provided. In one exemplary embodiment the auxiliary power system includes an auxiliary alternator coupled to the internal combustion engine of the locomotive. The system further includes an auxiliary power bus powered by the auxiliary alternator. A rectifier may be connected between the auxiliary alternator and the auxiliary power bus. A plurality of devices may be electrically powered by the auxiliary power bus. A respective inverter is connected between the auxiliary power bus and each device, wherein the inverter provides a path for diverting electrical power generated during a transient mode by at least one the plurality of devices. In one exemplary embodiment, the auxiliary alternator is made up of a single alternator connected through a single shaft to the internal combustion engine.

12 Claims, 3 Drawing Sheets

LOCOMOTIVE AUXILIARY POWER SYSTEM

BACKGROUND OF THE INVENTION

The present invention is generally related to locomotives and, in particular, to an auxiliary power system of a locomotive.

A diesel-electric locomotive typically includes a diesel engine coupled to drive a main alternator and a set of auxiliary alternators, made up of several physically distinct alternators. The main alternator is coupled to power one or more traction motors, and the auxiliary alternator set is coupled to power locomotive auxiliary electrical equipment. The auxiliary alternator set may include a first alternator for powering a battery, a second alternator for powering auxiliary equipment, and a third alternator for providing field excitation to the auxiliary alternator and the traction alternator.

It is known to provide variable frequency and/or voltage by way of inverters so that the auxiliary equipment may be driven at any speed below or above the engine speed. The auxiliary equipment is generally operable in an electrical power consumption mode but may be capable of at least transiently entering into an electrical power-generating mode. For example, due to windy conditions and prior to turn on, a cooling fan may be rotating opposite to its normal direction of rotation and during such a condition the cooling fan would generate electrical power. It is known that this power generating condition has necessitated either the addition of power dissipating resistor elements or, in lieu of using straightforward diode rectifiers, designers may be forced to use relatively costlier regenerative rectifier drives. Either of these options is not fully satisfactory since each entails incremental costs and undue complexity for the auxiliary power system of the locomotive. Thus, it would be desirable to provide system and techniques that allow to divert electrical power that may be generated by the auxiliary equipment in a manner that avoids or reduces such incremental costs and complexity and allows for useful utilization of such electrical power, as opposed to merely dissipating such electrical power into heat.

As noted above, the auxiliary alternator in known auxiliary power systems for locomotives is traditionally made up of three physically distinct alternators. This consumes valuable and scarce space in the locomotive and requires careful analysis of mechanical resonances that may develop along the common shaft that mechanically interconnects these distinct alternators to the internal combustion engine of the locomotive. Thus, it would be desirable to provide a locomotive auxiliary power system wherein the auxiliary alternator comprises just a single alternator that may be connected through a single shaft to the internal combustion engine.

U.S. Pat. No. 6,486,568, assigned in common to the same assignee of the present invention discloses innovative techniques regarding a power system for a locomotive, including an option that allows removing altogether the auxiliary alternator for powering the auxiliary bus of the locomotive. It is noted that traditional auxiliary equipment (such as may part of a fleet of field-deployed locomotives) is generally operated at a different voltage than the operating voltage of the traction motors. For example, the traction motors may be typically operated at a relatively higher voltage, while the auxiliary equipment may be operated at a relatively lower voltage. Accordingly, if the voltage level of a common bus, or bus voltage, for powering both the traction motors and the auxiliary equipment is set to a voltage level appropriate for powering the traction motors, the auxiliary equipment may not be able to be directly connected to the bus because the bus voltage is different from the voltage required to power the auxiliary equipment. Thus, it would be desirable to provide a locomotive power system with a common bus for powering the traction motors and the auxiliary equipment and configured to enable such auxiliary equipment to be compatible with the voltage level available at that common bus.

BRIEF SUMMARY OF THE INVENTION

Generally, a first embodiment of the present invention fulfills aspects of the foregoing needs by providing a method of controlling a device connected to an auxiliary power bus of a locomotive. The device is generally operable in an electrical power consumption mode but is capable of at least transiently entering into an electrical power generating mode. The method allows determining when the device is operating in the electrical power generating mode. The method further allows diverting electrical power generated by the device to the auxiliary power bus so that the device exits the power generating mode. When the device exits the power generating mode, the device may be set to operate in the power consumption mode.

A second embodiment of the present invention fulfills further aspects of the foregoing needs by providing a locomotive auxiliary power system that includes an auxiliary alternator coupled to the internal combustion engine of the locomotive. The system further includes an auxiliary power bus powered by the auxiliary alternator. A rectifier is connected between the auxiliary alternator and the auxiliary power bus. A plurality of devices may be powered by the auxiliary power bus. A respective inverter is connected between the auxiliary power bus and each device, wherein the inverter provides a path for diverting electrical power generated during a transient mode by at least one the plurality of devices. A processor is provided that includes a module for detecting when at least one of the plurality of devices is operating in the transient mode. The processor further includes a module for diverting electrical power generated by at least one of the plurality of devices to the auxiliary power bus so that such a device exits the transient mode and is ready to receive power for entering into an operational mode. In one exemplary embodiment, the auxiliary alternator comprises a single alternator connected through a single shaft to the internal combustion engine.

A third embodiment of the present invention fulfills still additional aspects of the foregoing needs by providing a power system for providing both primary and auxiliary electrical power for a railroad locomotive having traction motors powered by primary electrical power, auxiliary electrical loads powered by auxiliary electrical power, and an internal combustion engine coupled to drive a single alternator for generating power for both the primary and auxiliary power. The power system includes a rectifier electrically coupled to receive AC electrical power from the alternator and generate DC power. The power system further includes a direct current (DC) bus electrically coupled to receive electrical power from the rectifier. The DC bus has a voltage level that may be sufficient for powering the traction motors but may be outside a desired voltage range for powering the auxiliary electrical loads. At least one DC-to-AC converter is electrically coupled to receive electrical power from the DC bus, with that at least one DC-to-AC converter configured to drive an auxiliary electrical load connected thereto at the voltage range for powering such an auxiliary electrical load.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
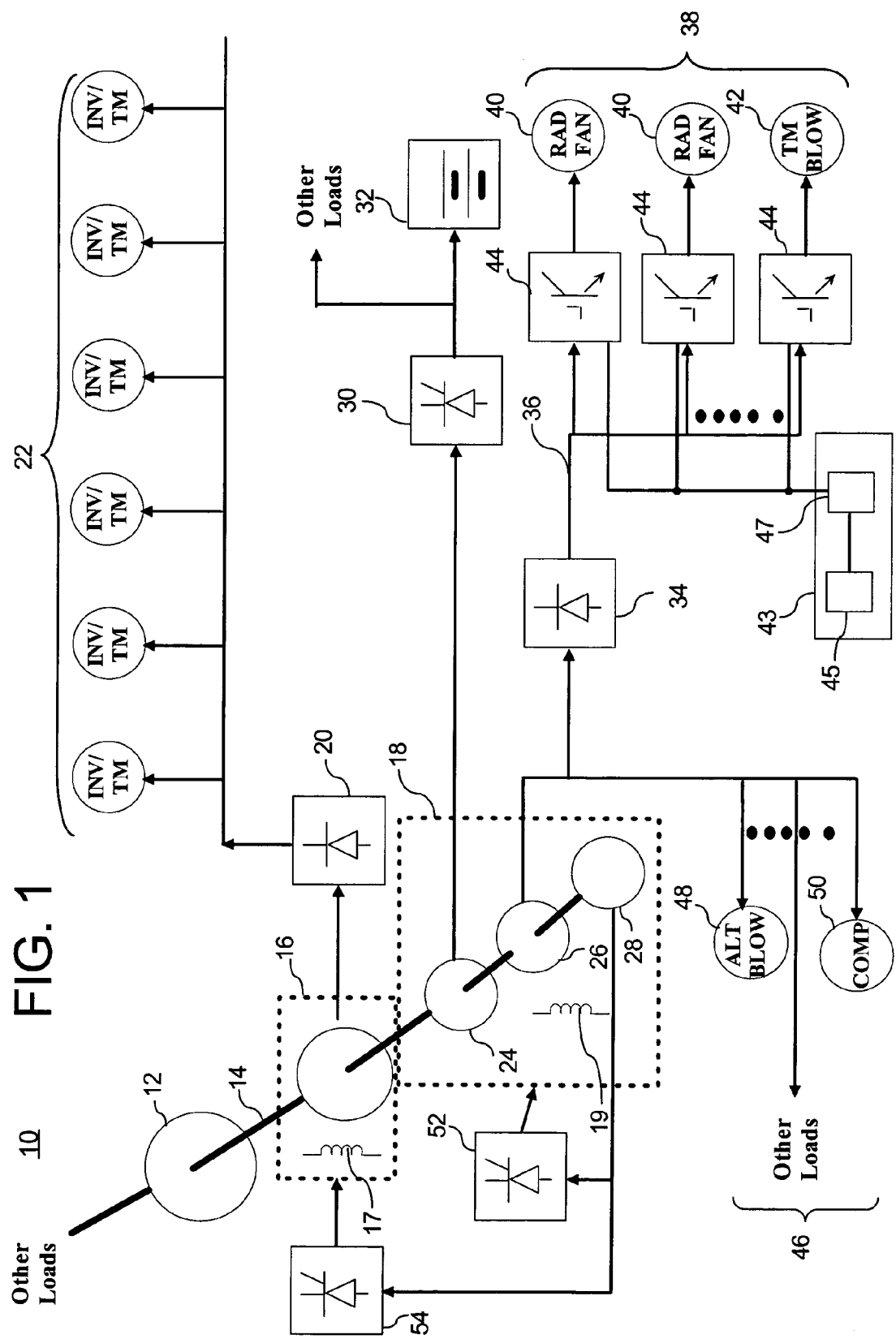
FIG. 1 is a block diagram schematic of an exemplary embodiment of a locomotive power system in accordance with aspects of the present invention.

FIG. 1 is a block diagram schematic of an exemplary embodiment of a locomotive power system 10 in accordance with aspects of the present invention. This system 10 includes an engine 12 having a shaft 14 coupled to a main alternator 16 and an auxiliary alternator 18. The main alternator 16 may be electrically coupled via rectifier 20 to one or more traction motors 22. The main alternator 16 and the auxiliary alternator 18, being directly coupled to the engine 12 via the shaft 14, may generate alternating current (AC) having a frequency proportional to a speed of the engine 12. Accordingly, the output frequency of the auxiliary alternator 18 is a direct function of the diesel engine speed, such as the revolutions per minute (rpm) of the engine 12.

In one embodiment, the auxiliary alternator 18 includes three physically distinct alternators 24, 26, and 28, wherein each alternator is coupled to control respective auxiliary loads and is rated for a maximum power required to power each alternator's respective load. For example, alternator 24 may be coupled via a rectifier 30 for converting the AC power generated by the alternator 24 to direct current (DC) to charge a battery 32. Alternator 26 may be coupled to a rectifier 34 for providing DC power to an auxiliary equipment bus 36. Auxiliary equipment devices 38, such as a radiator fan motor 40 and a traction motor blower 42, may be individually connected to the bus 36 via respective inverters 44 that convert the DC power, made available on the bus 36 by the rectifier 34, into AC power having a frequency and voltage independent of the AC power generated by the auxiliary alternator 18. Accordingly, operation of the auxiliary equipment devices 38 may be advantageously decoupled from the speed of the engine 12.

The inverters 44 convert the DC voltage to an appropriate AC voltage having a desired frequency for driving the auxiliary equipment at a desired frequency. In one aspect of the invention, the inverters 44 may be controlled by a processor 43 to selectively provide variable frequency and/ or variable voltage AC power to each of the devices 38 coupled to the bus 36 via inverters 44. For example, the processor 43 may include a controller 45 to provide a signal to vary the frequency of AC power supplied to a fan motor 40 to achieve a desired fan rotation speed for cooling. Unlike cycle skippers that may have been used in the past to provide discrete levels of auxiliary operating AC current, the rectifier 34 and inverter 44 combination allows continually variable speed control of a speed sensitive device connected via the inverter 44. As explained in greater detail below, the processor 43 may also include a sensor 47 for sensing a condition of the device 38.

In another aspect, the alternator 26 may also be directly connected to other loads 46 such as an alternator blower 48 and air compressor 50. Alternator 28 may be connected to the field windings 19 of the auxiliary alternator 18 through the auxiliary alternator exciter 52 and may also be connected to the field windings 17 of the traction alternator 16 via traction alternator exciter 54. It should be understood that the auxiliary power system 10 could also be used for a DC powered locomotive wherein each respective traction inverter coupled to the traction motors 22 may be replaced with a respective DC/DC converter to isolate operation of the traction motors from the engine speed. It is noted that DC motors may be directly connected to the traction bus without the need of a DC/DC converter and, in this case, regulating the field winding 17 of the traction alternator 16 would control the voltage level provided to the DC traction motors.

In another aspect of the invention, the locomotive power system 10 configuration described above may be used to implement a method of sinking and sourcing power according to an operating mode of a device 38 connected to the bus via respective inverter 44. In one embodiment, the device 38 may be generally operable in an electrical power consumption mode, but capable of at least transiently entering into an electrical power generating mode. The device 38 may include an electrodynamic rotating machine consuming electrical power when rotating in a first direction, and generating electrical power when rotating in a second direction opposite to the first direction. For example, the device 38 may include a radiator fan motor 40 that rotates in one direction when powered via the bus 36 to activate a cooling fan attached to the motor 40, and may also be transiently rotated in an opposite direction, such as by wind acting on the cooling fan, wherein the fan motor 40 operates in a power generation mode.

In one exemplary embodiment, the method may include determining if the device 38 connected to the bus 36 is operating in a power generation mode. For example, the sensor 47 may be configured monitor a condition of the device 38 to determine its operating mode. In an electrodynamic rotating machine embodiment, the sensor 47 may monitor a direction of shaft rotation of the machine, or may monitor a voltage on the bus 36 to determine when the device is transiently operating in a power generation mode. For example, for a radiator fan motor 40 connected to the bus 36 via inverter 44, the fan motor 40 may be normally operated in an electrical power source consumption mode by sinking power from the bus 36 through inverter 44 to cause the radiator fan motor 40 to rotate according to a frequency of an AC voltage provided by the inverter 44. However, there are times when the radiator fan motor 40 may not need to be powered and the fan motor 40 is allowed to freely rotate without being powered, such as when the fan motor 40 is turned off if cooling provided by the fan attached to the motor 40 is not desired. While in an off condition, the fan motor 40 may enter a transient operation mode, for example, by being rotated in an opposite direction from a normal rotation as the result of wind exerting a rotational force on the fan blades attached to the fan motor 40. Accordingly, the radiator fan motor 40 may act as a generator and may actually provide electrical power back through the inverter 44 to the bus 36. Such a transient mode may be detected by monitoring a voltage of the current supplied to the radiator fan motor 40, such as by monitoring a voltage on the bus 36 via the sensor 47. The bus voltage may be measured to determine if the voltage on the bus 36 is rising, indicating that the bus 36 is absorbing power generated by a device connected to the bus 36. In another embodiment, the sensor 47 may include a motor shaft speed sensor capable of detecting a direction of rotation of the radiator fan motor 40. In another embodiment, the traction motor blower 42 may be configured for monitoring the voltage on the bus 36. Accordingly, if the voltage on the bus 36 is increasing, this condition is indicative that power is coming from one or more of the radiator fans motors 40.

When the device 38 is operating in a transient mode of generating power, the controller 43 may divert electrical power generated by the device 38 to the auxiliary power bus 36 so that the device 38 exits the power-generating mode. Sufficient power may be diverted from the device 38 to drain energy from the device 38 until the device 38 ceases the power generation mode. For example, if radiator fan 40 is rotating in an opposite direction from a normal, powered rotation, then such radiator fan should be stopped before being rotated in the normal direction to provide cooling air to the radiator. If the fan 40 is determined to be rotating in the opposite direction, the frequency of rotation may be monitored to determine the opposite rotation frequency of the fan motor 40. After the opposite rotation frequency is determined, an AC power having a frequency sufficient to rotate the fan motor 40 at normal rotation frequency slightly less than the determined opposite rotation frequency may be applied to slow the fan motor 40 down. The AC power frequency may be gradually reduced to slow the fan down until it reaches a rotation speed of zero. In the past, resistive elements (not shown) may have been required so that such resistive elements dissipate into heat electrical power generated by devices 38 connected to the bus 36. In yet another power diverting embodiment, electrical power generated by fan motors 40 connected to the bus may be diverted to a traction motor blower 44 connected to the bus 36 to advantageously provide additional cooling capacity for the traction motors 22, even if the cooling provided by the blower prior to diverting power thereto is already sufficient.

Once the device 38 exits the power generation mode, the device 38 may be set to operate in a power consumption mode and then transitioned to a power consumption mode by providing power to the device 38 from the bus 36 through its respective inverter 44. For example, when a fan motor 40 has been slowed down until it reaches a rotation speed of zero, the AC frequency of power supplied to the motor 40 may be gradually increased until the fan motor 40 reaches a desired rotational frequency in the normal rotation direction.

Figure 2:
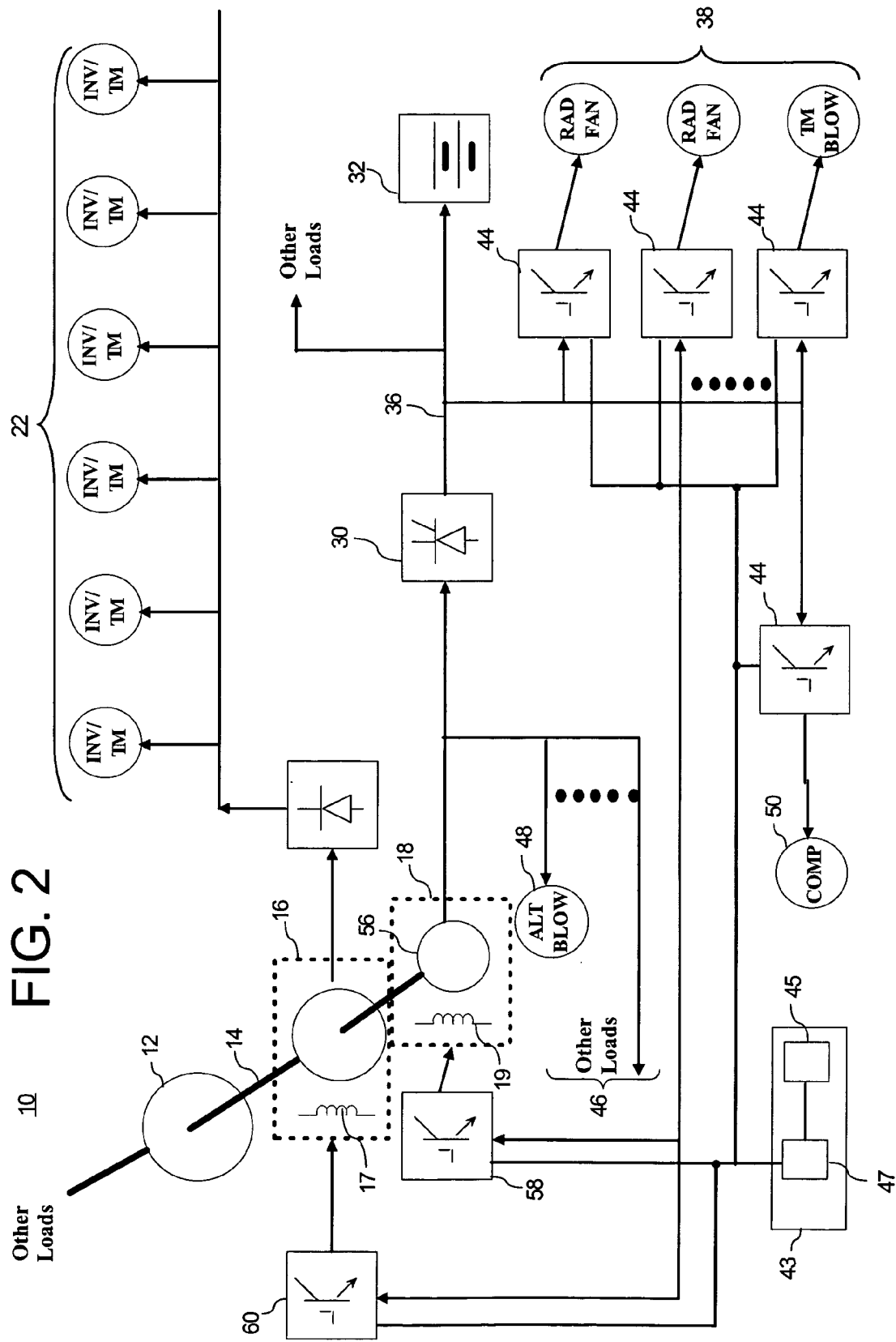
FIG. 2 is a block diagram schematic of another exemplary embodiment of the power system in accordance with further aspects of the present invention.

In yet another aspect of the invention, the three alternators 24, 26 and 28 in the auxiliary alternator 18 may be replaced by a single alternator 56 (FIG. 2). The single alternator 56 may be directly connected to other loads 46 such as the alternator blower 48, and connected to the auxiliary bus 36 through a single rectifier 30 coupled to inverters 44 thereby isolating the auxiliary equipment 38 from frequency variation caused by a direct connection of the auxiliary alternator to the engine. It is noted that any load including the alternator blower described above could be supplied through a variable speed drive. In one aspect of the invention, the battery 32, the auxiliary equipment 38 and exciter devices are all connected to the auxiliary bus 36. By way of example, the auxiliary equipment 38 and the compressor 50 may be connected to the bus 36 via respective inverters 44. The traction alternator windings 17 and the auxiliary alternator windings 19 may be connected to the bus 36 via respective DC/DC converters 58 and 60, which in this example function as the exciter devices for the auxiliary and traction alternators respectively. Similarly, the battery could be controlled through a DC/DC converter as well. Advantageously, control over the functioning of the auxiliary equipment is isolated from the frequency of the single auxiliary alternator 56 and can be more finely controlled than was possible in the past.

In addition, the single auxiliary alternator 56 eliminates the need for separate alternators and may be sized smaller than the total size of the three separate alternators 24, 26 and 28 it replaces. For example, the three separate alternators 24, 26 and 28 may need to be sized and rated for the maximum power needed to be supplied to their respective components, regardless if the components are on or off. However, by using a single alternator 56 to power all the components (each of which may not need to be fully powered concurrently), the single alternator 56 may be rated at a lower power than the sum of the ratings of the three alternators 24, 26 and 28 that it replaces by taking advantage of the fact that all components connected to the alternator 56 may not be powered at the same time. For example, when the radiator fan 40 is fully loaded, the battery 32 may not need to be powered, so the alternator may not need to be rated to provide full power to each of the loads at the same time. Advantageously, a single alternator 56 takes up less space than the space required to house the three individual alternators 24, 26 and 28 and may require less maintenance and may be less expensive than providing three separate alternators 24, 26 and 28.

Figure 3:
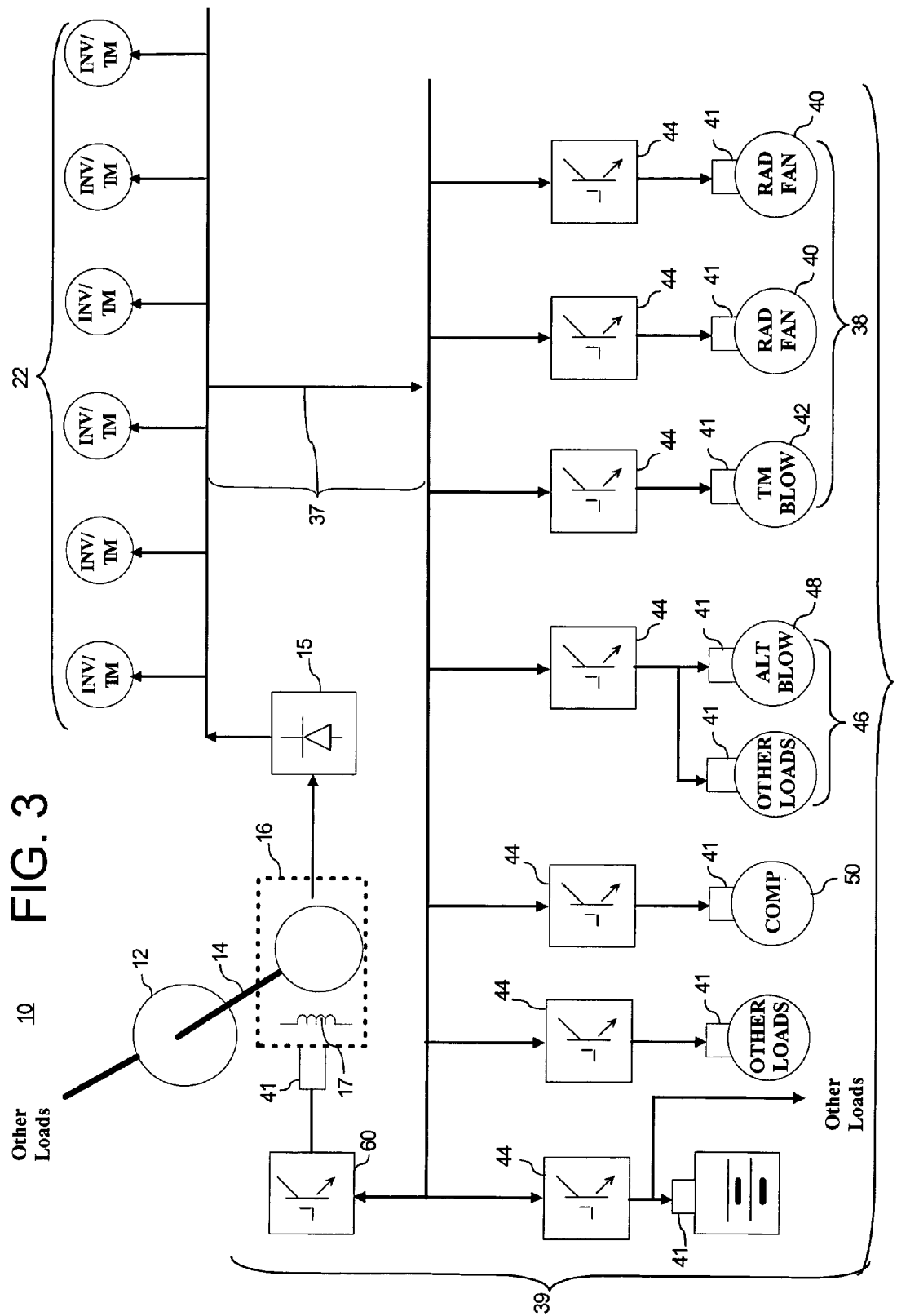
FIG. 3 is a block diagram schematic of another exemplary embodiment of the power system in accordance with still further aspects of the present invention.

FIG. 3 is a block diagram schematic of another exemplary embodiment of the power system 10 in accordance with further aspects of the present invention. In the embodiment depicted in FIG. 3, the auxiliary alternator 18 (as shown in FIGS. 1 and 2) may be eliminated, and both the traction motors 22 and the auxiliary equipment 39 may be connected to the single main alternator 16 via a rectifier 15 that provides power to a common power bus 37. For example, the rectifier 15 may be configured for converting the AC power generated by the main alternator 16 to DC power having a voltage sufficient for powering the traction motors 22 and provide the DC power to the common power bus 37. Auxiliary equipment devices 38, such as a radiator fan motor 40 and a traction motor blower 42, may be individually connected to the bus 37 via respective DC to AC converters, or inverters 44, such as pulse width modulators (PWMs), that convert the DC power, made available on the bus 37 by the rectifier 15, into AC power having a frequency and voltage independent of the AC power generated by the main alternator 16.

It is noted that traditional auxiliary equipment 39 (such as may part of a fleet of field-deployed locomotives) may be operated at a different voltage than the operating voltage of the traction motors 22. For example, the traction motors may be typically operated at a range from approximately 200 volts to approximately 1400 volts, while the auxiliary equipment 39 may be operated at a range from approximately 200 volts to approximately 600 volts. Accordingly, when the voltage level of the bus, or bus voltage, is set to a voltage level appropriate for powering the traction motors 22, such as 1400 volts, this auxiliary equipment may not be able to be directly connected to the bus 37 because the bus voltage is different from the voltage required to power the auxiliary equipment 39. By way of example, in a retrofit installation, auxiliary equipment 39 connected to the bus 37 may need to be modified to run at a traction motor bus voltage. As described in greater detail below, aspects of the present invention allow performing a relatively low cost and straightforward modification to such auxiliary equipment in order to fully realize the advantages offered by the power system exemplarily illustrated in FIG. 3.

In a new equipment embodiment, the auxiliary equipment may be specified and configured to be operated at the traction motor bus voltage. For example, the radiator fan motor 42 may be specifically designed and configured to operate at the traction motor bus voltage. However, in a retrofit embodiment wherein existing auxiliary equipment 39 is desired to be used, auxiliary equipment 39 comprising dynamoelectric machines (such as radiator fan motors 40, traction motor blower 42, and alternator blower 48) may be retrofitted with a kit that includes an impedance modifying circuit 41 for allowing such auxiliary equipment to be powered at the traction motor bus voltage. For example, the impedance modifying circuit 41 may be connected to windings of the dynamoelectric machines, such as by including additional winding turns in a manner readily understood by those skilled in the art, to modify the impedance of the machine to allow the machine to operate at the traction motor bus voltage. For an energy storage device, such as battery 41, the impedance circuit 41 may be a transformer. Accordingly, the kit allows auxiliary equipment to be connected to the common bus without the necessity of scrapping existing auxiliary equipment and replacing it with new equipment specifically designed to operate at the traction motor bus voltage. It will be appreciated that one may alternatively configure the inverters 44 to be compatible with the higher voltage available on the bus 37. For example, one may use power switches with a higher voltage rating than the one typically used in a power system with separate traction and auxiliary buses.

Using the above described system, a power producing capacity, or rating, of the main alternator may need to be increased to be able provide sufficient power to both the traction motors and the auxiliary equipment. However, the incremental cost of providing a relatively higher power rated alternator and modifying the auxiliary equipment to operate at a different voltage, is believed to outweigh the cost and space requirements of providing a second alternator. One could also regulate the field winding 17 of the main alternator 16 in order to control the voltage provided on the common bus 37.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of controlling a device connected to an auxiliary power bus of a locomotive, the device generally operable in an electrical power consumption mode but capable of at least transiently entering into an electrical power generating mode, the method comprising:
   determining when the device is operating in the electrical power generating mode;
   diverting electrical power generated by the device to the auxiliary power bus so that the device exits the power generating mode; and
   when the device exits the power generating mode, setting the device to operate in the power consumption mode, wherein the device operates in the power consumption mode when rotating in a first direction, and further wherein the device operates in the power generating mode when rotating in a second direction opposite to the first direction.

2. A method of controlling an electrodynamic device connected to a locomotive auxiliary power bus, the electrodynamlc device consuming electrical power when rotating in a first direction and generating electrical power when rotating in a second direction opposite to the first direction, the method comprising:
   determining when the device is rotating in the second direction;
   diverting electrical power generated by the electrodyriamic device to the locomotive auxiliary power bus so that the electrodynamic device stops rotating; and
   supplying electrical power to the electrodynamic device after the device has stopped rotating so that the device rotates in the first direction.

3. A locomotive auxiliary power system comprising:
   an auxiliary alternator coupled to the internal combustion engine of the locomotive;
   an auxiliary power bus powered by the auxiliary alternator;
   a rectifier connected between the auxiliary alternator and the auxiliary power bus;
   a plurality of devices powered by the auxiliary power bus, wherein at least one the devices consumes electrical power when rotating in a ftrst direction, and further wherein said at least one device generates electrical power when rotating in a second direction opposite to the first direction during a transient mode;
   a respective inverter connected between the auxiliary power bus and each device, wherein said invader provides a path for diverting electrical power generated during the transient mode by said at least one the plurality of devices; and
   a processor comprising a module for detecting when the at least one of the plurality of devices is operating in the transient mode, and a module for diverting electrical power generated by the at least one of the plurality of devices to the auxiliary power bus so that the at least one of the plurality of devices exits the transient mode and is ready to receive power for entering into an operational mode.

4. The system of claim 3, wherein the auxiliary alternator comprises a plurality of alternators connected in tandem through a common shaft to the internal combustion engine, at least one of the alternators powering the auxiliary power bus.

5. The system of claim 3, wherein the auxiliary alternator comprises a single alternator connected through a single shaft to the internal combustion engine.

6. A power system for providing both primary and auxiliary electrical power for a railroad locomotive having traction motors powered by primary electrical power, auxiliary electrical loads powered by auxiliary electrical power, and an internal combustion engine coupled to drive a single alternator for generating power for both the primary and auxiliary power, the power system comprising:
   a rectifier electrically coupled to receive AC electrical power from the alternator and generate DC power;
   a direct current (DC) bus electrically coupled to receive electrical power from the rectifier, said DC bus having a voltage level sufficient for powering the traction motors but outside a desired voltage range for powering the auxiliary electrical loads; and
   at least one DC-to-AC converter electrically coupled to receive electrical power from the DC bus, with said at least one DC-to-AC converter configured to drive an auxiliary electrical load connected thereto at the voltage range for powering said auxiliary electrical load, wherein the auxiliary load operates in an power consumption mode when rotating in a first direction, and further wherein the auxiliary load operates in a power generating mode when rotating in a second direction opposite to the first direction.

7. The power system of claim 6 wherein said DC bus in part comprises an auxiliary bus, with the DC-to-AC converter being electrically connected to said auxiliary bus.

8. The power system of claim 6 wherein the DC-to-AC converter drives the auxiliary load at an adjustable frequency.

9. The power system of claim 6 wherein said at least one DC-to-AC converter comprises a pulse-width modulated inverter.

10. The power system of claim 6, wherein the auxiliary electrical load further comprises a kit including an impedance modifying circuit for allowing the auxiliary electrical load to be powered at the voltage level provided by the DC bus.

11. A power system for providing both primary and auxiliary electrical power for a railroad locomotive having traction motors powered hy primary electrical power, auxiliary electrical loads powered by auxiliary electrical power, and an internal combustion engine coupled to drive a single alternator for generating power for both the primary and auxiliary power, the power system comprising:
  a rectifier electrically coupled to receive AC electrical power from the alternator and generate DC power;
  a direct current (DC) bus electrically coupled to receive electrical power from the rectifier, said DC bus having a voltage level sufficient for powering the traction motors but outside a desired voltage range for powering the auxiliary electrical loads; and
  at least one DC-to-AC converter electrically coupled to receive electrical power from the DC bus, with said at least one DC-to-AC converter configured to drive an auxiliary electrical load connected thereto, wherein said auxiliary electrical load has an impedance chosen for allowing said auxiliary electrical load to be powered at the voltage level provided by the DC bus, wherein the auxiliary load operates in a power consumption mode when rotating in a first direction, and further wherein the auxiliry load operates in power generating mode when rotating in a second direction opposite to the first direction.

12. A power system for providing both primary and auxiliary electrical power for a railroad locomotive having traction motors powered by primary electrical power, auxiliary electrical loads powered by auxiliary electrical power, and an internal combustion engine coupled to drive a single alternator for generating power for both the primary and auxiliary power, the power system comprising:
  a rectifier electrically coupled to receive AC electrical power from the alternator and generate DC power;
  a direct current (DC) bus electrically coupled to receive electrical power from the rectifier, said single alternator including a field winding responsive to a field control signal applied thereto so that said DC bus provides a voltage having a range sufficient for powering the traction motors and for powering the auxiliary electrical loads; and
  at least one DC-to-AC converter electrically coupled to receive electrical power from the DC bus, with said at least one DC-to-AC converter configured to drive an auxiliary electrical load connected thereto, wherein the auxiliary load operates in a power consumption mode when rotating in a first direction, and further wherein the auxiliary load operates in a power generating mode when rotating in a second direction opposite to the first direction.

* * * * *